Sept. 12, 1939.  W. W. HARTMAN  2,173,038
BAND BLADE SLICING MACHINE
Filed June 18, 1938  7 Sheets-Sheet 1

Inventor
William Walter Hartman
Attorney.

Sept. 12, 1939.  W. W. HARTMAN  2,173,038
BAND BLADE SLICING MACHINE
Filed June 18, 1938  7 Sheets-Sheet 2
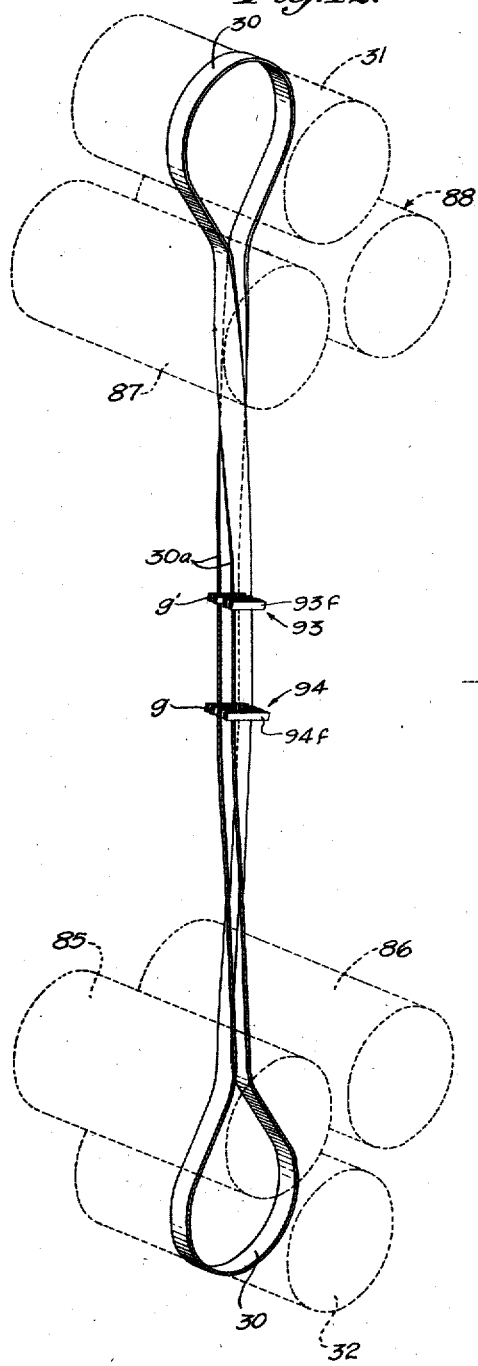
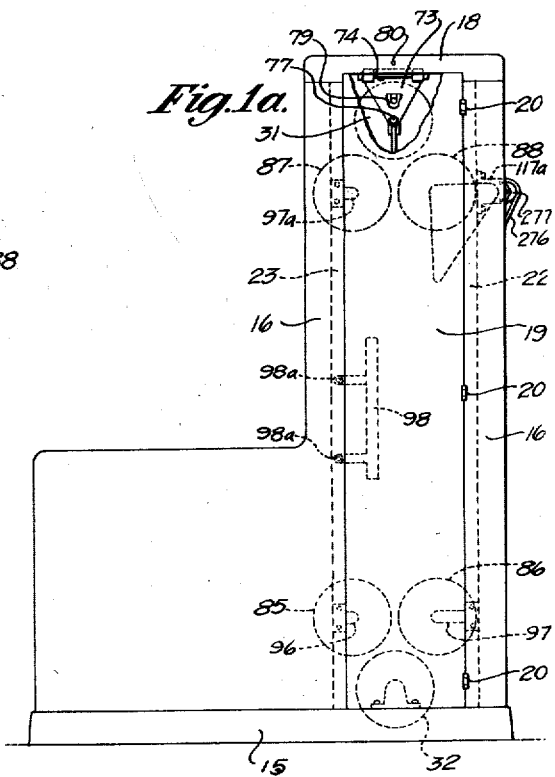
Inventor
William Walter Hartman.
Attorney.

Inventor
William Walter Hartman.

Attorney.

Sept. 12, 1939.　　　W. W. HARTMAN　　　2,173,038
BAND BLADE SLICING MACHINE
Filed June 18, 1938　　　7 Sheets-Sheet 6
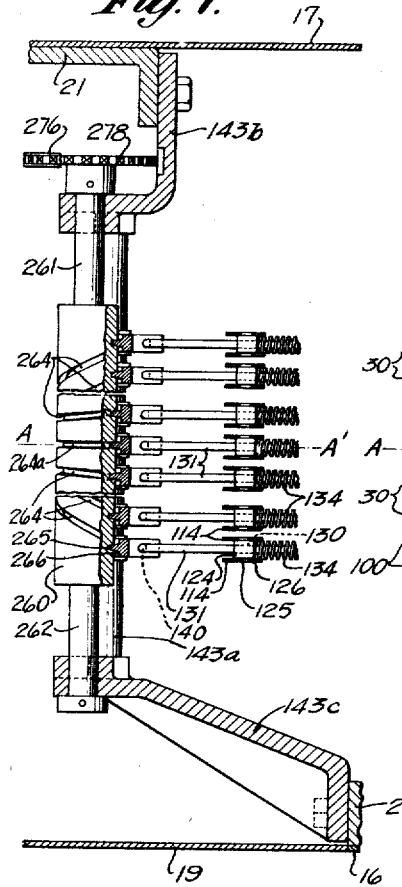
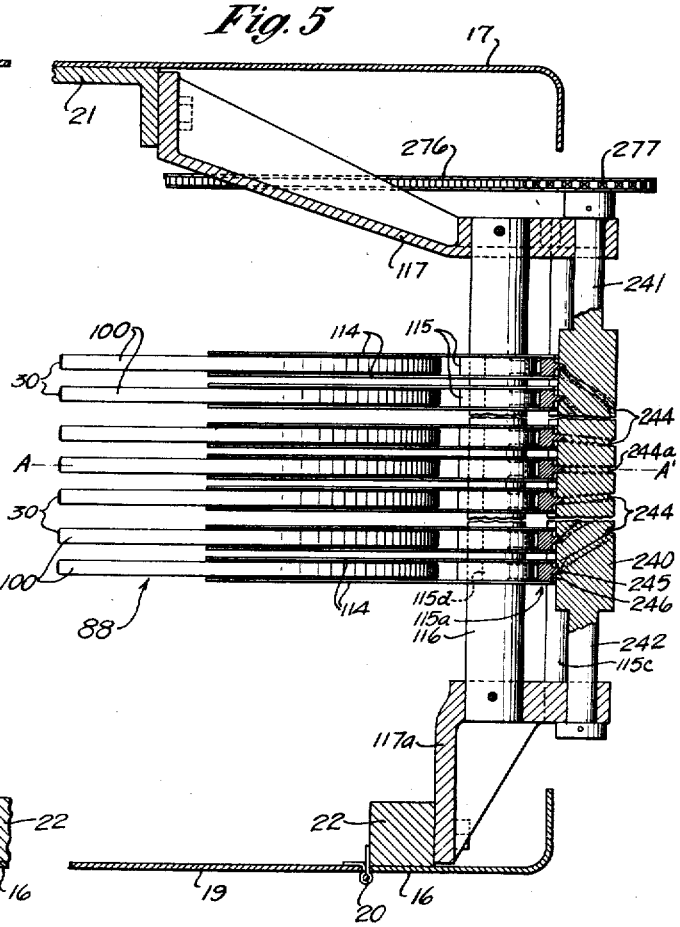
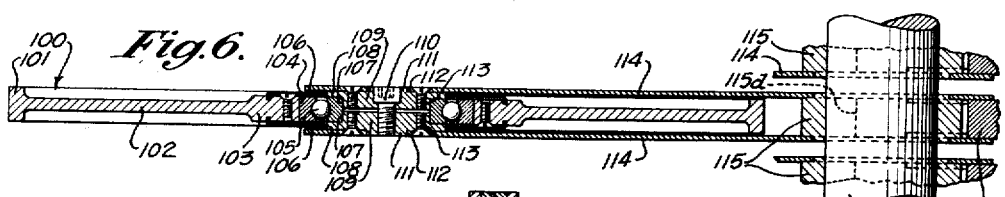
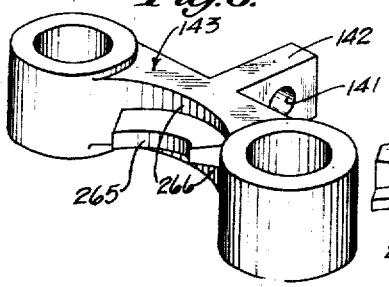
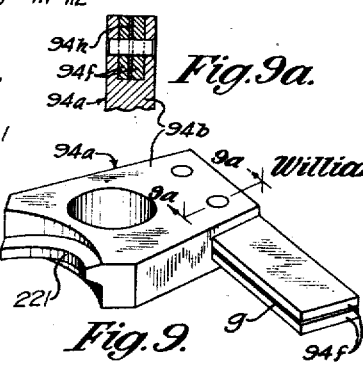
Inventor
William Walter Hartman.
Attorney.

Sept. 12, 1939.　　　　W. W. HARTMAN　　　　2,173,038
BAND BLADE SLICING MACHINE
Filed June 18, 1938　　　7 Sheets-Sheet 7

Inventor
William Walter Hartman.
Attorney.

Patented Sept. 12, 1939

2,173,038

UNITED STATES PATENT OFFICE 2,173,038

BAND BLADE SLICING MACHINE

William Walter Hartman, Los Angeles, Calif.

Application June 18, 1938, Serial No. 214,482

16 Claims. (Cl. 146—88)

This invention relates generally to bread and other article slicing machines of the endless band blade type, and deals more particularly with means for adjusting the blade separation distance in such machines for the purpose of regulating thickness of slice.

Bread slicing machines of the endless band type usually comprise a multiplicity of endless band blades trained on a system of drums or pulleys, and so arranged as to present a multiplicity of blade courses disposed in spaced parallel slicing planes along which the loaves are successively passed during slicing. In addition to the drums and the blades, such slicers include as essential elements certain blade twisting guide members coacting with the blades to twist them into the aforesaid spaced parallel slicing planes at the slicing location, and in the form of band slicer to which this invention particularly relates, it is customary to segment one of the band blade drums to comprise a multiplicity of individual blade tensioning drums which are movably mounted to permit pressural engagement of one such individual drum with each blade to thereby tension the blades.

Ordinarily endless band blade slicers of this type cannot be quickly and readily adjusted to cut slices of different thickness.

It is accordingly an object of the present invention to provide a slicing machine of the above described type in which novel means are provided for quickly and conveniently adjusting the slice thickness that is to be cut.

A further object of this invention is to provide for spreading or contracting the above mentioned blade twisting guide members and for also correspondingly spreading or contracting the above mentioned individual blade tensioning drums to thereby adjust the machine for different slice thicknesses as above described.

It is a further object of this invention to provide that during the aforesaid adjustment of the machine each blade tensioning drum will constantly maintain tensioning engagement with its blade as the latter moves in the course of such adjustment, so that the machine can be adjusted while running.

Other objects and features of this invention will become apparent by consideration of the drawings, the following specification and the appended claims.

While my invention can take various forms and embodiments, and is subject to extensive modifications, I believe it can be best understood by referring to the following detailed description of a present preferred embodiment thereof, reference being directed to th accompanying drawings, in which:

Fig. 1a is a side elevation of the machine, with parts broken away;

Fig. 5 is a section taken on line 5—5 of Fig. 4; the blade engaging drums being shown in elevation;

Fig. 6 is an enlargement of a portion of Fig. 5, with parts in section; but showing an individual blade engaging drum in section;

Fig. 7 is a section taken as indicated by line 7—7 of Fig. 4;

Fig. 8 is a detailed perspective of one of the helix followers to which a blade tensioning means is anchored;

Fig. 9 is a perspective of one of the helix actuated blade guides;

Fig. 9a is a fragmentary section taken on line 9a—9a of Fig. 9;

Fig. 12 is a somewhat exaggerated perspective view of a single band blade showing a preferred manner of threading and twisting the blades in the machine.

Figure 1:
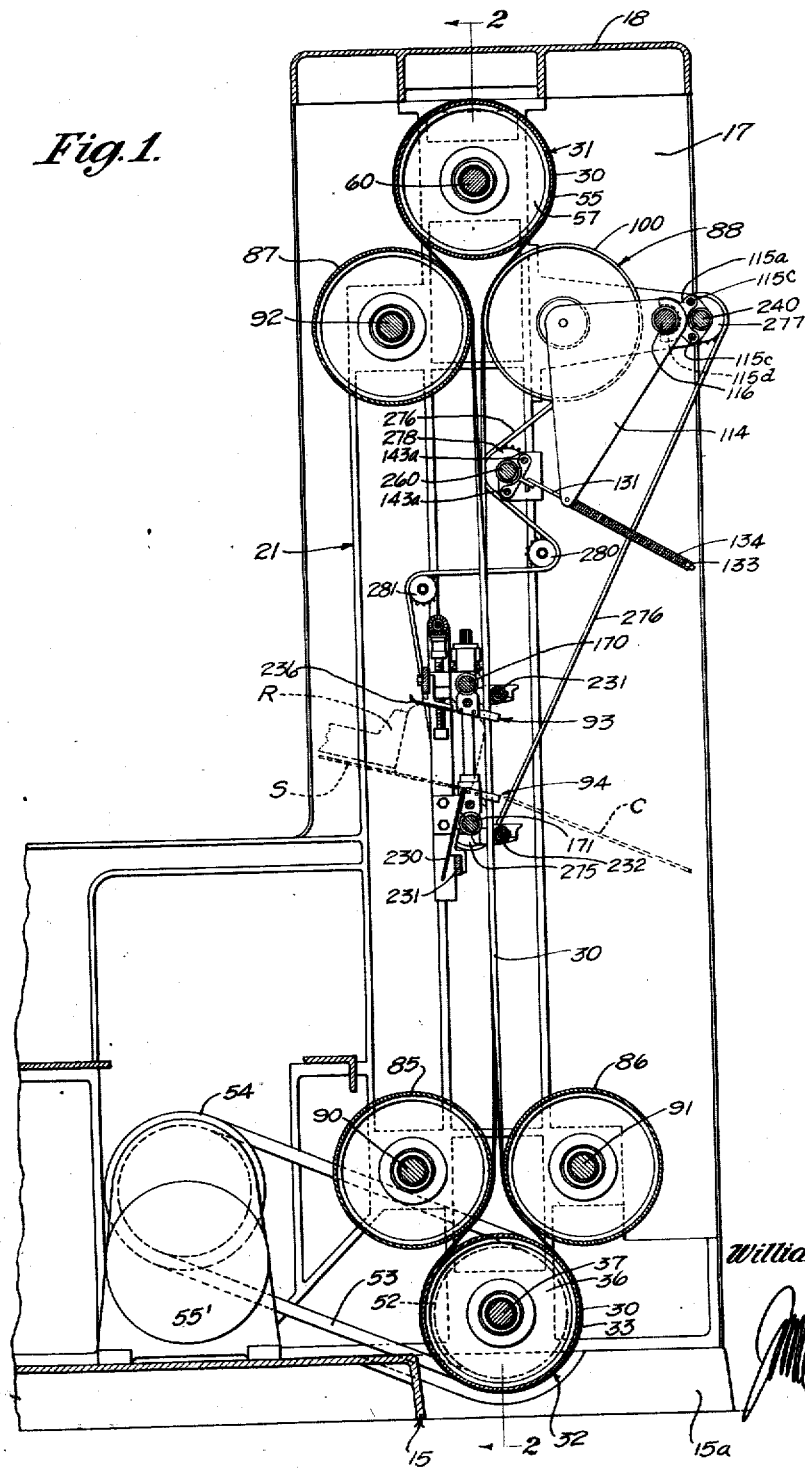
Fig. 1 is a vertical longitudinal section of a typical slicing machine built in accordance with the present invention, the view being taken as indicated on line 1—1 of Fig. 2.

The general frame structure of the machine includes base 15, and mounted on this base is a frame comprising front and rear sides 16 and 17 and a top 18. Front side 16 is provided with a swinging door 19 hinged as at 20. A frame casting 21 extends vertically from base 15 to top 18 adjacent the inner surface of frame side 17, and supports the mechanism as hereinafter to be explained. A pair of vertical bars 22 and 23 extend from base 15 to top 18 adjacent the inner surface of side 16, and also serves to support the slicing mechanism.

A plurality or series of endless band blades 30 are looped over a plurality of band blade drums which in this instance may be described as the upper and lower blade supporting drums 31 and 32, respectively, which are here illustrated of preferably the same diameter and preferably have their axes substantially parallel and in the same vertical plane. The blades preferably go on drums 31 and 32 in the manner indicated in Fig. 12, the band loop being first passed over upper drum 31, then being twisted through a half turn, and finally passed over lower drum 32. This threading arrangement brings the cutting edges 30a of the central portions of both courses of the band blades to a position directed toward the front end of the machine, from which direction the loaves or other articles are fed against the blades.

Figure 2:
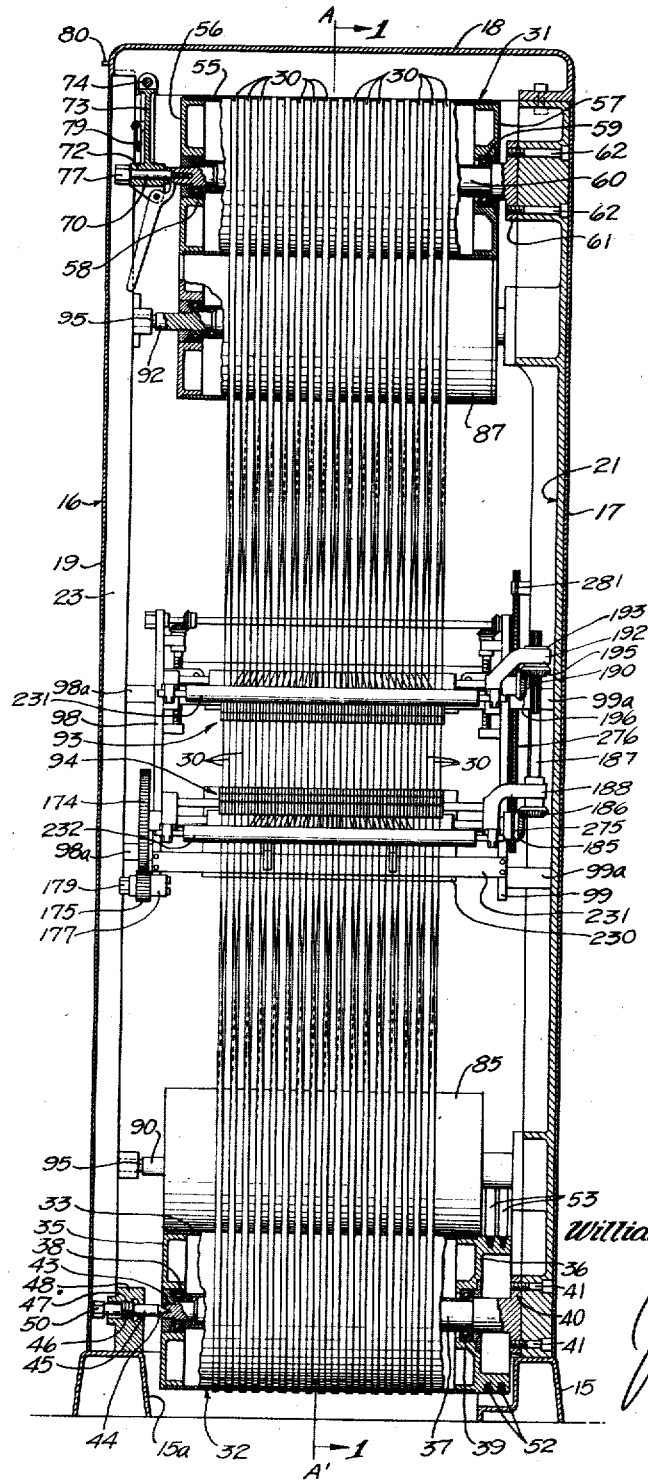
Fig. 2 is a vertical section taken on line 2—2 of Fig. 1, the upper and lower band blade drums, together with the blades, being shown principally in elevation.

Lower drum 32 is mounted as low in the machine as possible. For this purpose, base member 15 is formed with an opening 15a adapted to receive the lower portion of the drum, as indicated in Fig. 2. This drum 32 comprises a cylindrical shell 33 mounted on ends 35 and 36, which are in turn mounted for rotation on a non-rotatable shaft 37, as indicated for instance at 38 and 39 in Fig. 2. The rearward end of said shaft 37 is provided with a flange 40 by which it is secured to mounting casting 21, as by means of screws 41. The entire weight of the drum may thus be supported at this one end of shaft 37. A removable support is provided for the other end of the shaft. Thus, said other end of shaft 37 is formed with a conical recess 43 adapted to receive the pointed end 44 of a centering shaft 45, said shaft 45 being externally screwthreaded at 46 and being screwed within the internally screwthreaded bore 47 of a supporting member 48 mounted on the base portion 15 of the frame. The outer end of shaft 45 has a hexagonal head 50 by which said shaft may be turned to screw the shaft into and out of engagement with drum shaft 37, thus making members 37 and 45 separable to clear a space for placing the endless blades on over drum 32. During operation of the machine the drum is steadied by shaft 45. The inner end of drum 32 is formed with a pair of peripheral V-grooves 52 for driving belts 53 driven by a pulley 54, the latter being driven through suitable reduction gears, not shown, from the shaft of an electric motor 55' mounted on base 15.

Upper drum 31 consists similarly of a cylindrical shell 55 mounted on drum ends 56 and 57, which are in turn rotatably mounted by means of bearings 58 and 59 on a nonrotatable shaft 60, the inner end of the latter having a flange 61 secured as by screws 62 to frame casting 21, as clearly indicated in Fig. 2. The outer end of shaft 60 is drilled and internally screwthreaded to receive the screwthreaded extremity of a shaft 70 which is rotatably mounted in a bearing 72 carried by the lower end of a hanger 73 pivotally mounted on a horizontal pin 74 which is supported at right angles to shaft 70 on a flange integral with top 18 of the frame. The outer end of shaft 70 has a hexagonal head 77 by means of which said shaft is screwed into or backed out of engagement with the screwthreaded socket in the end of shaft 60, thus making members 60 and 70 separable from one another for the purpose of placing a new blade on over drum 31. When it is desired to place a new blade in the machine, the side door of the machine is swung open, and this shaft 70 is then backed out of engagement with shaft 60, after which hanger 73 is swung outwardly and upwardly and is temporarily secured in an upper inoperative position by engaging a loop 79 carried by the hanger over a pin 80 mounted on frame top 18 above the side door. An endless band blade may then be passed over drum 31.

Mounted at an elevation above that of lower drum 32, and preferably one on either side of the plane passing through the axes of upper and lower drums 31 and 32, is a pair of band blade drums which in this instance may be described as rotatable blade deflecting idler or guide drums 85 and 86, the drums 32, 85 and 86, in the form of the invention here shown, lying quite close to one another, as illustrated in the drawings. Similarly, there is mounted at an elevation below that of upper drum 31, and preferably one on either side of the plane passing through the axes of drums 31 and 32, another pair of band blade drums which in this instance may be described as rotatable blade deflecting drums 87 and 88, the drums 31, 87 and 88 likewise lying quite close to one another in the form of the machine here illustrated.

To provide automatic, individual tensioning of the blades 30, one of the aforementioned band blade drums is segmented into a plurality of individual blade tensioning drums, one for each band blade 30. In the present illustrative embodiment of the invention, drum 88 has been selected for such segmentation. As so illustrated, this drum 88 is made up of a series of individual blade tensioning drums 100, as will later be described in more detail, but insofar as the blade deflecting function is concerned, the segmented drum 88 may for many purposes be broadly considered as a single drum like 31, 32, 85, 86 and 87. As shown in the drawings, drums 85, 86, 87 and 88 engage all the courses of the band blades between upper and lower drums 31 and 32 and deflect said courses substantially over toward the plane that passes approximately midway between upper drums 87 and 88, and lower drums 85 and 86, this plane, in the illustrative embodiment, also passing approximately through the substantially parallel axes of drums 31 and 32.

Along the blade courses between the drums, I provide two sets of blade twisting guide means 93 and 94, which are so spaced apart as to form between them a slicing zone for the blades, through which the loaves or other articles to be sliced are fed. In this slicing zone the blades run in spaced parallel planes, having been twisted into such planes by said blade twisting guide means.

In accordance with one present preferred embodiment of the invention, these blade guide means 93 and 94 are each made up of a set or row of blade guide devices, one for each blade course, and these guide devices are adjustably movable to vary the spacing between blade courses. Thus, as here shown, lower blade guide means 94 comprises a multiplicity of blade guide devices 94a, each embodying a mounting block 94b slidably mounted on shaft 94c, which latter extends transversely of the blade courses and just forwardly thereof, and is supported at its ends on brackets 94d and 94e. These brackets 94d and 94e are mounted on vertical supporting bars 98 and 99 spaced just within the sides of the machine and somewhat ahead of the cutting plane defined by the vertically moving blades. Bar 98 is mounted on frame member 23 by means of post 98a, while bar 99 is mounted on posts 99a extending from frame casting 21.

Figure 4:
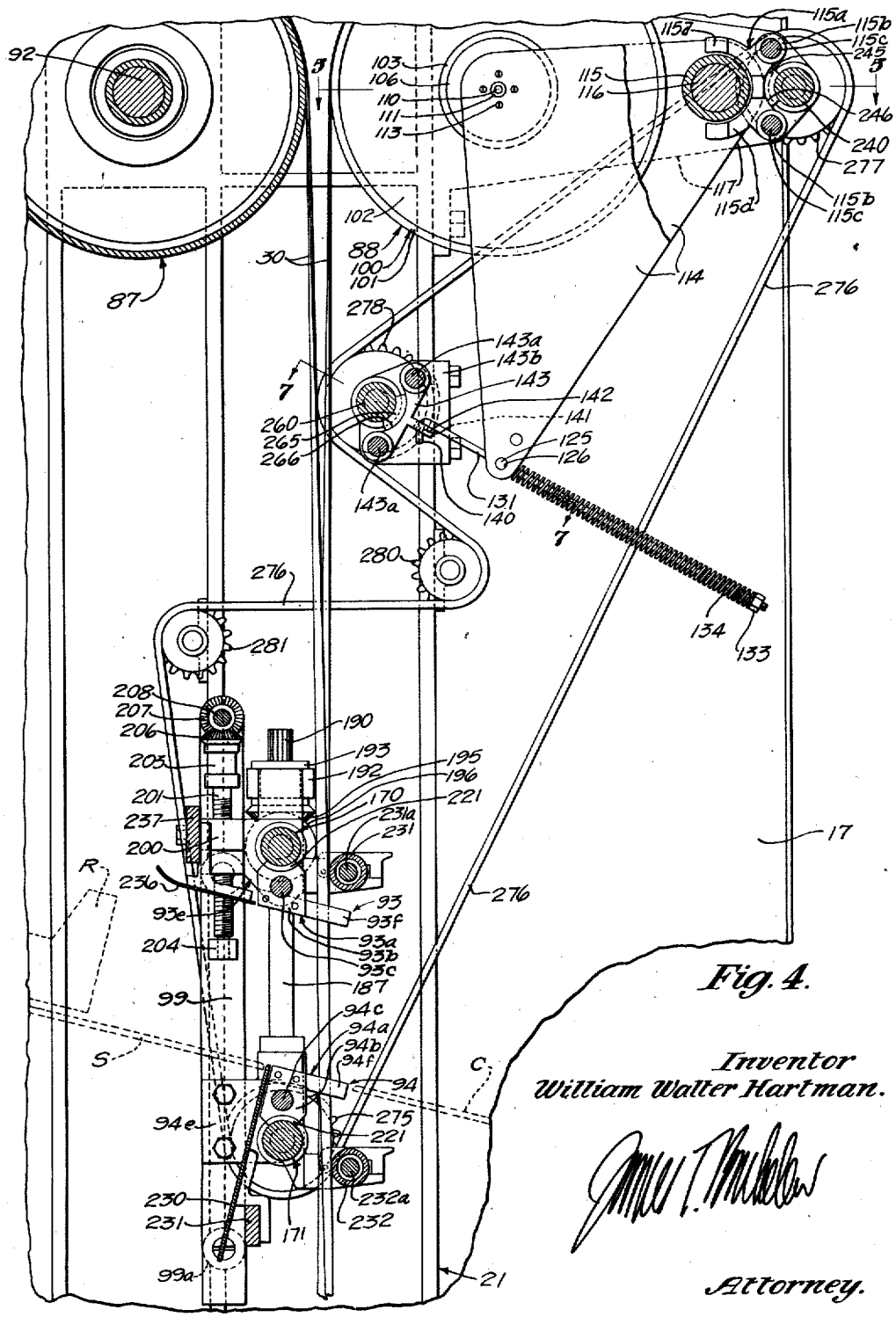
Fig. 4 is an enlargement of a portion of Fig. 1.

The aforementioned mounting blocks 94b are each provided with means affording a blade receiving guide slot g. Thus, as here illustratively shown, the upper portion of each mounting block 94b is provided with a pair of spaced blade guide members 94f, here illustratively shown in the form of flat rectangular plates, spaced apart by a distance just slightly greater than the thickness of a blade so as to afford a free running fit. These flat guide plates reach from the mounting block toward and past the blade courses, as illustrated in Fig. 4. Preferably, guide members 94f are not integral with blocks 94b, but are separate members of hard wear resisting material mounted in grooves 94g in the upper end portions of said blocks, spacers 94a being placed between members 94f to space them properly for the blades (see Fig. 9a).

Upper blade guide means 93 similarly comprises a corresponding multiplicity of blade guide devices 93a, embodying mounting blocks 93b slidably mounted on a transverse shaft 93c supported at its ends by brackets or mountings 93d and 93e. The latter are not secured to supporting bars 98 and 99, but are vertically slidable therealong for adjustment purposes, as later to be described. The lower end portions of mounting blocks 93b are provided with means affording blade receiving guide slots g' adapted to be vertically alined with the aforementioned guide slots g of the lower blade guide means. Thus, blocks 93b have mounted on their lower end portions spaced pairs of flat, rectangular blade guide members 93f, generally similar to lower guide members 94f.

Assuming the blade courses to be vertically disposed at the slicing zone, it is preferable that the loaves pass through the blades in somewhat of a downward direction, so as to present a corner of the loaf to be attacked by the blades. Blade guide members 93f and 94f are accordingly disposed at the desired angle of travel of the loaves through the blades, and their lower and upper edges, together with the flush lower and upper end surfaces of mounting blocks 93a and 94a, serve as supporting and hold-down means, respectively, for the loaves during their passage through the blades. As here illustratively indicated, the loaves are advanced onto said supporting means from an inclined sustaining plate or member S, which may support the loaf until it is moved onto said supporting means, and may then be retracted to permit the next loaf to be lifted to position along a guide plate 230, the latter being mounted immediately forwardly of blade guide members 94a on a cross-bar 231 secured to the frame in any suitable manner. Any suitable means may be employed for thus lifting the loaf along guide plate 230, until plate S is enabled to move in under it, as to the position indicated in Figs. 1 and 4. The loaf being in such position, it is engaged by means adapted to move it through the blades; for example, a reciprocating ram R, made of as usual of a plurality of spaced ram fingers or plates adapted to move in between the blades, may engage the loaf while it rests on plate S and advance it from plate S onto the load supporting surfaces presented by the upper edge surfaces of blocks 94b and plates 94f, and thus through and finally clear of the blades. The loaf being clear of the blades, it is next received by any outfeed conveyor, diagrammatically indicated in Figs. 1 and 4 at C. The preferred loaf feeding means is only diagrammatically indicated, as it may be of a prior type completely disclosed in my Patent No. 2,106,949, dated February 1, 1938, to which reference may be had for a complete description of such mechanism.

The blade receiving guide slots g' and g provided by the upper and lower rows of blade guide devices 93a and 94a (which will be understood to be identical except for the angles at which the flat, blade guide plates are supported) are adapted to be positioned in adjusted, vertically alined positions, so as to receive the individual courses of the band blades, the spacing of said guide devices being adjustable to regulate the spacing of the blade courses, and therefore the thickness of slice.

As will appear from an inspection of the drawings, the downwardly and upwardly travelling courses of each band blade are received by the guide slots of adjacent blade guide devices 93a and 94a, in such manner that each blade course makes a 90° twist between each guide device and the drum from which, or onto which, that blade course is travelling. Between guide devices 93a and 94a, the blade courses are disposed in spaced parallel slicing planes, and their cutting edges preferably are all nearly or substantially parallel, and approximately in a common plane extending transversely of the machine, i. e., approximately parallel to the axis of the blade supporting drums 31 and 32, so that a loaf moving against said cutting edges of the blades is attached substantially simultaneously by all the blade courses, both upwardly and downwardly travelling.

In Fig. 12 there is illustrated a preferred band blade arrangement in which the band blade is looped over the upper drum with the sharp or cutting edge 30a of the blade pointing in one direction; the blade is then given a 180° twist between the upper and lower drums, and is looped over the lower drum with the cutting edge 30a pointing in the opposite direction. Consequently, each of the two courses of each blade crosses from one side of one of the blade supporting drums to the opposite side of the other of the blade supporting drums about which the blade is mounted. This arrangement is preferred because it gives to each blade course a natural twist that brings the central portion of the course close to the desired cutting position without aid of the blade twisting guide means, and also because it brings the two courses of each blade naturally together at the place where they cross or intersect centrally of the drums, as viewed in Fig. 1.

The previously mentioned blade deflecting guide drums 85, 86 and 87 are mounted for rotation on fixed center shafts 90, 81 and 92, respectively, and these center shafts may be substantially like the previously described shafts 31 and 60, their rearward ends being provided with mountings on frame casting 21 similar to those described for shafts 37 and 60. The forward ends of shafts 90, 91 and 82, however, are provided with reduced portions 95 carried by bracket arms 96, 97 and 97a secured to frame posts 22 and 23.

Drum 88, as previously mentioned, comprises a series or row of individual drums or rolls 100, the peripheries of which engage individual band blades travelling between upper drum 31 and idler drum 85. The make-up of this segmented drum 88 is shown best in Figs. 5 and 6, to which reference is now directed. Each roll 100 comprises a rim 101, whose periphery is adapted to engage an individual blade, and a web 102 and hub 103. Hub 103 is formed with an axial bore 104, within which is received the outer race ring of a ball bearing 105, said bearing being retained by a pair of circular retainer plates 106 secured to hub 103. The inner race ring of bearing 105 is mounted on outwardly facing annular shoulders 107, and between flanges 108, formed on a pair of discs 109, which are secured together and pressed against the sides of inner race ring of bearing 105 by means of screw 110. The outer flat faces of disks 109 are provided with trunnions 111 which are received in circular openings 112 formed in a pair of parallel substantially triangular flat plates 114, the latter being secured to discs 109 by screws 113. Plates 114 are mounted on a hub 115 which is rotatable on, as well as slidable along, a relatively stationary shaft 116 extending transversely of the machine and having its ends held in brackets 117 and 117a secured to frame casting 21 and frame bar 22. Each drum or roll 100 is similarly supported for rotation on a pair of plates 114 mounted on a hub which is rotatable on and slidable along common shaft 116, the rolls thus being independently rotatable and arranged for independent swinging about shaft 116. Shaft 116 is located to the rear of the axis of drums 100, and substantially at the height of center shaft 92 of the opposed idler drum 87, and it will be evident that swinging movement of plates 114 in a right-handed direction, as viewed in Fig. 1, will bring individual rolls 100 into tensioning engagement with the individual blades passing over drum 31.

The hubs being slidable along shaft 116, they, together with the pairs of roll-carrying plates 114 which they support, may be moved therealong for the purpose of adjustment of the spacing between individual blade engaging rolls 100. For the purpose of such movement of hubs and plates 114, 115, shifter fork devices 115a are provided, each having two hubs or perforated bosses 115b slidable along a pair of parallel guide or mounting rods 115c mounted at their end on the aforementioned brackets 117 and 117a. As illustrated, these rods 115c are parallel to and just to the rear of the shaft 116 on which hubs 115 are mounted. Shifter forks 115a have arms 115d which engage between the portions of plates 114 that extend outwardly from hubs 115 (see Figs. 4, 5 and 6). Adjustment means for moving the shifter forks to slide the pairs of plates 114 and individual blade engaging rolls 100 carried thereby will be described later.

The blades being properly positioned on upper and lower drums 31 and 32 to correspond with the spacing of rolls 100, which spacing is regulated in a manner later to be described, they are then tensioned by swinging plates 114 in a right-handed direction, as viewed in Fig. 1, said plates 114, which act as lever means or bell cranks, thereby lifting rolls 100 into engagement with the blades just below upper drum 31. The blades are then separately tensioned by individual blade tensioning assemblies, a preferred form of which will now be described.

A block 124 is provided between the lower portions of each pair of plates 114, and this block is provided with trunnions 125 rotatably received in circular openings 126 in plate 114. Slidable through a bore 130 in block 124 is a tension rod 131. The rearward end of this rod has screwthreaded thereon a tension adjustment nut 133, which engages one end of a compression spring 134 encircling rod 131 and engaging at its other end against block 124. The forward end of each tension rod 131 is formed with a hook portion 140 adapted to engage an eye 141 formed in a lug 142 projecting from an individual reaction means or anchor member 143. There is one such reaction means or anchor member 143 for each tension rod 131, and therefore for each blade engaging roll 100, all of the anchor members 143 being slidably mounted for adjustment purposes on a pair of parallel mounting rods 143a extending in a direction transversely of the blade courses and supported at their ends on brackets 143b and 143c secured to the machine frame (Fig. 7). Thus members 143 may be adjusted along rods 143a to accommodate their positions to the positions of blade tensioning rolls 100.

Each blade is tensioned by hooking its corresponding tension rod 131 to its corresponding anchor member 143 and then, if necessary, adjusting compression spring 134 by adjustment of nut 133. Thus each band blade is individually tensioned, and even though the length of individual blades may vary somewhat, they may be brought to equal tension by proper adjustment of nuts 133.

Preferably, the blade courses are backed up at the slicing zone by two long rollers 231 and 232, which are rotatably mounted in any suitable manner on shafts 231a and 232a, shaft 231a being supported on the aforementioned mountings 93d and 93e, and shaft 232a being supported on the aforementioned mountings 94d and 94e. For a more complete description of such backing-up rollers and their purpose, reference may be had to my copendinig application entitled "Band blade slicing machine", file May 14th, 1938, Ser. No. 207,931.

For the purpose of adjusting the thickness of slice to be cut by the machine, blade guide members 93a and 94a defining the planes of the blade courses and the separation distances therebetween are moved along their mounting members 93c and 94c, respectively, roll-carrying plates 114 are moved along mounting member 116 to adjust the positions of blade engaging rolls 100 as made necessary by the adjustment of the blade guide members, and anchor members 143 are moved along their mounting means 143a in correspondence to the movement of rolls 100. The amounts of the movements imparted to these members are such that in all final positions of adjustment, the spaces between blade guide members 93a and 94a are equal to one another, the spaces between rolls 100 are equal to one another, and the spaces between anchor members 143 are equal to one another. It is highly preferable, though in simple forms of the invention this feature may be omitted, that means be provided whereby all these adjustments, or such of them as are used, may be coordinated to automatically bring about from a single operating source the final uniform spacing of the parts as just described. Preferred and illustrative means for accomplishing these adjustments in accordance with the invention will now be described in detail, and first will be described the means for adjusting the blade guide members 93a and 94a.

Figure 3:
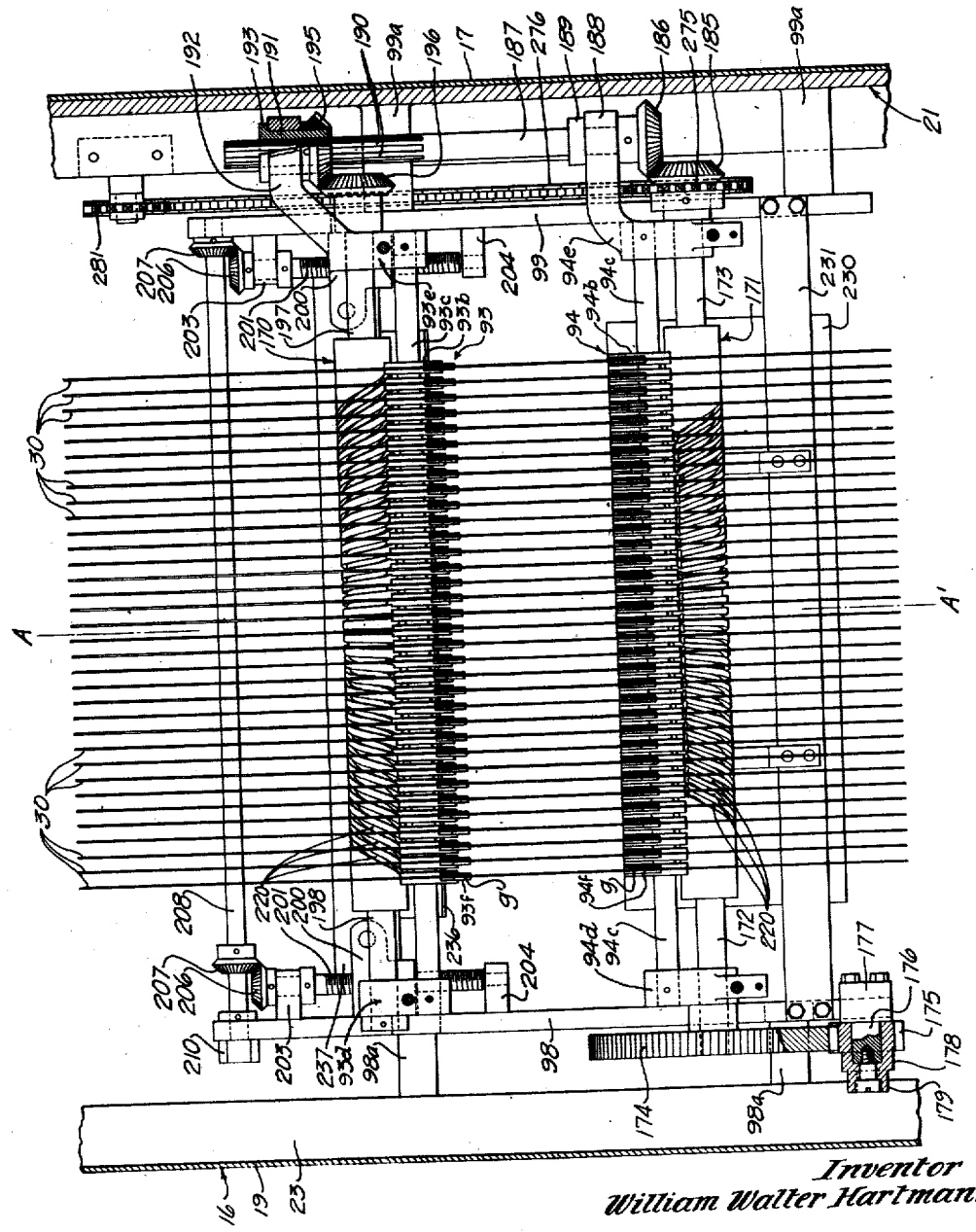
Fig. 3 is an enlarged detail taken from Fig. 2, with parts removed and broken away.

Mounted above and below shafts 93c and 94c and parallel thereto are two cylindrical screw or helix members 170 and 171, respectively. Lower member 171 is provided at its ends with coaxial reduced shaft portions 172 and 173 journalled in the aforementioned brackets 94d and 94e (see Fig. 3). Shaft portion 172 extends beyond bracket 94d, and has mounted on its extremity a gear 174, which meshes with a gear 175 which is rotatable on a stud 176 extending from a bracket member 177 mounted on frame bar 98 (Fig. 3). Integral with gear 175 is a hub 178 having hexagonal or other shaped head 179 adapted to receive any suitable turning means such as a hand crank or wrench, not illustrated, by which gear 175 may be rotated to drive gear 174 and thereby turn screw member 171.

Shaft portion 173 at the other end of screw member 171 extends beyond bracket 94e, and has mounted on its extremity a bevel gear 185 which meshes with a bevel gear 186 on a vertical shaft 187. The lower portion of shaft 187, just above bevel gear 186, is mounted for rotation in an extension 188 of bracket 94e, and is provided immediately above said bracket with a collar 189 that bears on the upper side of bracket extension 188. The upper portion of shaft 187 is formed with splines 190, and splined on shaft portion 190 is a sleeve 191 rotatably mounted in an extension 192 of the previously mentioned mounting member 92e. The upper end of sleeve 191 has an outwardly extending flange portion 193 supported by the upper side of bracket member 192, while pinned or otherwise fastened on the lower end of sleeve 191 is a bevel gear 195, all as clearly illustrated in Fig. 3. Bevel gear 195 meshes with a bevel gear 196 mounted on the extremity of a reduced shaft portion 197 extending from the ends of screw member 170, shaft portion 197 being journalled in mounting member 93e. The opposite end of screw member 170 has a reduced shaft portion 198 journalled in the aforementioned mounting member 93d.

Mounting members 93e and 93d have extension portions 200 which screw-threadedly receive vertical lead screws 201. Lead screws 201 are supported by and adapted to turn in upper and lower bearings 203 and 104, respectively, mounted on the inner faces of bars 98 and 99. The upper ends of these lead screws carry bevel gears 206 which mesh with bevel gears 207 mounted on a horizontal transverse shaft 208 journalled at its two ends in frame bars 98 and 99, being provided at its end adjacent side door 19 with a hexagonal turning head or member 210 by means of which it may be rotated by a suitable wrench.

Figure 10:
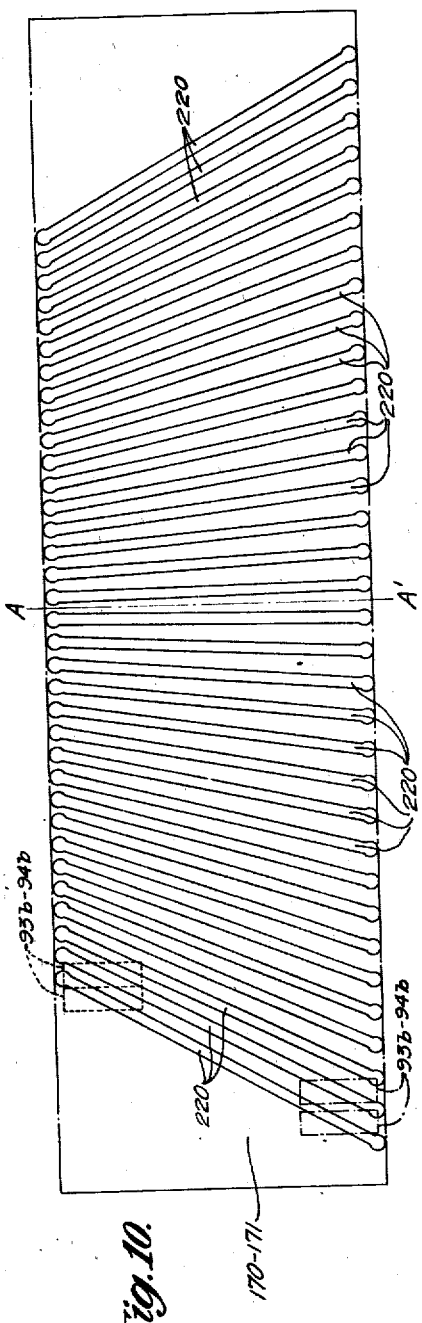
Figs. 10 and 11 are developed views of two types of helixes employed in the machine.
Figure 11:
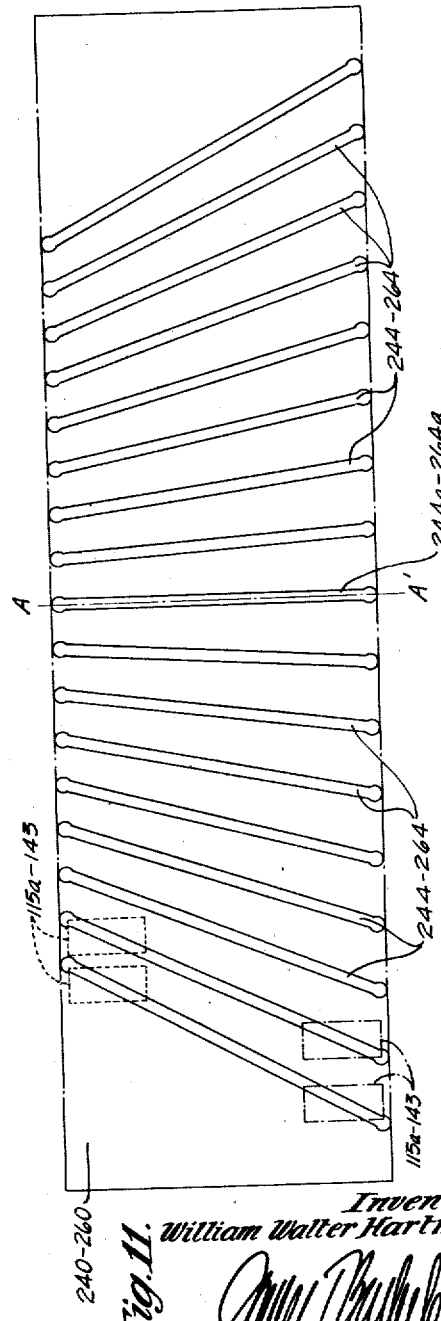

Blade guide members or devices 93a and 94a have screw-threaded association with screw members 170 and 171, respectively. This is accomplished in each instance by furnishing either the screw member or the blade guide members with helical screw-thread elements and the cooperating member or members with corresponding complementary helical thread elements or grooves adapted to coact therewith. In the particular form of the invention here chosen for illustrative purposes, screw members 170 and 171 are provided with screw elements in the form of a multiplicity of independent helixes or helical grooves 220, one for each cooperating blade guide member, while the blade guide members are provided with elements, preferably complementary screw-thread elements 221, adapted to engage and coact with said helixes or helical grooves 220. The elements 221 which engage in helical grooves 220 are preferably segments of spiral threads, of such pitches as to be received in the helical grooves. In simpler forms of the invention, however, these elements 221 may comprise any means adapted to engage in the helical grooves and receive movement therefrom as the helically grooved screw member is rotated. The helical grooves 220 are illustrated in Fig. 3, and in the developed view of Fig. 10. Each helix or helical groove 220 is separate and independent of the others, and preferably extends substantially around the circumference of the member 170 or 171, as the case may be. There is one such helical groove 220 for each blade guide device of the associated blade guide means, and each blade guide device is provided on its edge presented toward the helically grooved member with a screw-thread element 221 which engages in its corresponding helical groove 220, so that when the members in which the helical grooves are formed are turned, the blade guide devices will be translated along their respective guide rods.

In the form of the invention illustrated in the drawings, the helixes or helical grooves 200 formed in screw members 170 and 171 are of right hand pitch on one side of a center line A—A' and of left hand pitch on the other side of said center line. The helixes are symmetrically located on both sides of center line A—A', which passes between the two middle helixes, and corresponding right and left hand pitch helixes on opposite sides of center line A—A' have the same lead, and are equidistant from said center line. The helixes are uniformly spaced from one another along members 170 and 171, but the pitches of successive helixes increase in both directions from center line A—A', all as will be readily understood from an inspection of Figs. 3 and 10.

Suppose for illustration the machine is to vary the slice thickness within a range of from $3/8''$ to $5/8''$. The lead of the two middle helixes of both members 170 and 171, on opposite sides of outer line A—A', will then be such that the middle blade guide devices 93a and 94a threadedly engaging therewith will be moved in opposite directions, each through a maximum distance of $1/8''$, by rotation of members 170 and 171. The blade guide devices next outside will at the same time be moved distances of $3/8''$, the next ones $5/8''$, the next ones $7/8''$, and so on by equal increments.

Thus, it will be understood that rotation of screw or helix members 170 and 171 will move the blade guide devices 93a and 94a threadedly engaging therewith in opposite directions on the two sides of center line A—A', so as to increase or decrease the spacing distances between successive blade guide devices while maintaining said spacing distances uniform with one another at all times. The adjustment is preferably made while the machine is running, and the blades travelling through the guide slots g and g' provided by said guide devices easily move along their guide drums to accommodate themselves to the adjusted positions of the blade guide devices. It will be evident that to increase the slice thickness by a given dimension, the two middle blade guide devices will each be moved by a distance equal to the half the adjustment desired, while successive blade guide devices on both sides of said middle members will in each instance be moved by a distance equal to the distance of movement of the adjacent blade guide device relative to the center line, plus the adjustment desired.

Rotation of the aforementioned hexagonal head 210 (Fig. 3) drives both lead screws 201, thereby elevating or lowering mounting members 93c and 93d carrying helix member 170 and blade guide devices 93a, sleeve 191 carrying bevel gear 195 sliding vertically on splined shaft 190 at such time. Such adjustment varies the vertical dimension between the upper and lower rows of blade guide devices 93a and 94a, respectively, for loaves of different heights. A loaf hold-down plate 236, positioned just ahead of upper blade guide devices 93a, in the plane of the lower loaf hold-down surfaces of said devices, is mounted on a crossbar 237 extending between and mounted on mountings 93e and 93d, and is accordingly adjusted for vertical position at the same time.

Rotation of hexagonal head 179 drives helix member 171 through gears 175 and 174, and helix member 170 is simultaneously rotated by means of gears 185, 186, 195 and 196 which drive the latter from helix 171. The two helix members are properly related and interconnected, so that the guide grooves g and g' of the rows of blade guide devices 93a and 94a are in exact alinement in all positions of adjustment of the mechanism.

At the same time that the blade guide devices are adjusted to vary the spacing of the blade courses, the individual blade tensioning rolls 100 and also the anchoring devices 143 for the means which hold the rolls in tensioning engagement with the blades are correspondingly adjusted.

For the purpose of so adjusting the positions of rolls 100, there is mounted to the rear of shaft 116 a cylindrically shaped screw or helix member 240, having at its ends reduced coaxial shaft portions 241 and 242 journalled in brackets 117 and 117a (see Fig. 5). This member 240 has helixes or helical grooves 244, adapted to receive and coact with elements 245, which are preferably complementary screw-thread elements, formed on the adjacent surfaces 246 of shifter forks 115a. Thus rotation of member 240 will effect translation of the shifter forks along guide rods 115b, depending upon the leads of the individual helical grooves 244.

Since in the illustrative embodiment of the invention the middle band blade on the machine has its two blade courses moved equal distances in opposite directions as slice thickness is adjusted, this one blade is not moved longitudinally of the blade guide drums to accomplish such adjustment, but simply has the central portions of its two courses moved further apart or closer together, as the case may be. Accordingly, the central blade engaging and tensioning roll 100 should not move during adjustment for slice thickness, and the central groove 244a of member 240 which governs the position of said central roll 100 therefore has zero pitch.

The helixes or helical grooves 244 on one side of central groove 244a are right hand pitch and of successively increasing lead, and on the other side of central groove 244a are of left hand pitch and also of successively increasing lead, the spacings of the grooves and their leads being such as to move rolls 100 by such distances as to accommodate them to the positions of the blades which they engage as the blades are moved longitudinally of the guide drums during adjustment for slice thickness.

For the purpose of corresponding adjustment of anchor devices 143, in cases where this adjustment is necessary, there is mounted forwardly of said anchor devices a cylindrical screw or helix member 260, which may be exactly like helix member 240. Thus member 260 has reduced coaxial shaft portions 261, and 262, journalled in the aforementioned brackets 143b and 143c, and has individual helixes or helical grooves 264, including a central groove 264a of zero pitch, and right and left hand helical grooves of increasing pitch on opposite sides of central groove 164a. These grooves 264 and 264a engage elements 265, which are preferably complementary screw-thread elements, on the adjacent surfaces 266 of anchor or reaction devices 143, and it will be understood that rotation of anchor helix member 260 synchronously with the rotation of helix member 240 will effect translation of anchor devices 143 in such manner as to keep them alined at all times with their corresponding blade engaging rolls 100.

Suitable gearing interconnecting helix members 170 and 171 for synchronous operation in adjusting the blade guide members to effect different blade spacings has already been described. For the purpose of interconnecting helix members 240 and 260 to operate simultaneously and synchronously with members 170 and 171, any suitable interconnecting gearing may be employed, of which the following is a typical example, and is preferred because of its simplicity. Shaft portion 173 of helix member 171 has, between bearing bracket 94e and bevel gear 185, a sprocket 275 on which is trained a chain 276. This chain 276 leads rearwardly and upwardly from sprocket 275 to a sprocket 277 on the end of the shaft portion 241 of helix member 240, then extends forwardly and downwardly to pass over a sprocket 278 on shaft portion 261 of helix 260, then passes around successive idler sprockets 280 and 281, and so back to sprocket 275.

The chain is placed on the sprockets with the sprockets all in such positions that the blade guide or spacing devices, the tensioning rolls 100, and the anchor devices 143 are all adjusted for a given blade spacing. When it is desired to adjust the blade spacing of the machine, a wrench or other hand tool is engaged with the aforementioned hexagonal head 179 and turned, and this operation effects rotation of the four helix members 170, 171, 240 and 260, which operate simultaneously and synchronously through their threaded connections with the individual blade guide devices and tensioning-roller positioning and tensioning means to spread said devices and means or move them together, but holding them always at uniform spacing distances. If the machine is in operation at the time the adjustment is made, the blades move easily along their guide drums to accommodate themselves to the positions of the guide slots g and g' of the blade guide devices. There is sufficient friction in the driving interconnections between the helix members that once in adjustment, they will remain in adjustment until again regulated. The blades are thus most easily and conveniently moved to any desired spacing distance by a single simple operation, and having been adjusted, will remain at the selected spacing distance until the spacing mechanism is again operated.

I have now illustrated and described one present preferred embodiment of my invention, as applied to one selected and preferred type of band blade slicing machine. It will of course be understood that my invention is also applicable to other types of band blade slicing machines, and is also capable of considerable modification and rearrangement without departing from the spirit and scope of the invention or the appended claims.

Subject matter of invention disclosed but not claimed in this application is claimed in my copending application Ser. No. 207,931, filed May 14th, 1938.

I claim:

1. A band blade slicing machine comprising spaced blade supporting drums, a plurality of endless band blades running side by side about said drums, a corresponding plurality of individually movable blade tensioning assemblies mounted side by side in opposition to said blades, said blade tensioning assemblies each comprising a blade tensioning roller engaging the corresponding blade, and yielding means urging said roller into pressural engagement with the blade, two courses of each of said blades between said drums being adapted to run in spaced parallel slicing planes, a row of blade twisting guide devices positioned along said blade courses and extending transversely thereof, there being one such guide device in said row for each blade course, said guide devices engaging the blade courses and causing them to run in said spaced parallel slicing planes, means for adjusting the spacing of said guide devices along a direction line extending transversely of the blade courses, whereby the spacing of the blade courses is adjusted, and means for correspondingly adjusting the spacing of the blade tensioning assemblies, including a rotatable screw member having a plurality of helixes of different pitches, one for each blade tensioning assembly, and individual means for moving each of said blade tensioning assemblies along a direction line extending transversely of the blades, said means having screwthreaded association with the helixes of said screw member, whereby rotation of the latter effects translation of said blade tensioning assemblies along said line of adjustment movement.

2. A band blade slicing machine comprising spaced blade supporting drums, a plurality of endless band blades running side by side about said drums, a corresponding plurality of individually movable blade tensioning assemblies mounted side by side in opposition to said blades, said blade tensioning assemblies each comprising a blade tensioning roller engaging the corresponding blade, and yielding means urging said roller into pressural engagement with the blade, two courses of each of said blades between said drums being adapted to run in spaced parallel slicing planes, a row of blade twisting guide devices positioned along said blade courses and extending transversely thereof, there being one such guide device in said row for each blade course, said guide devices engaging the blade courses and causing them to run in said spaced parallel slicing planes, a rotatable screw member extending transversely of the blade courses having a plurality of helixes of different pitches, one for each blade guide device, said helixes having screwthreaded association with said blade guide devices, whereby rotation of said screw member effects translation of said guide devices along a direction line extending transversely of the blade courses, in such manner as to vary the spacing of the blade courses, and means for correspondingly adjusting the spacing of the blade tensioning assemblies, including a rotatable screw member having a plurality of helixes of different pitches, one for each blade tensioning assembly, and individual means for moving each of said blade tensioning assemblies along a direction line extending transversely of the blades, said means having screwthreaded association with the helixes of said screw member, whereby rotation of the latter effects translation of said blade tensioning assemblies along said line of adjustment movement.

3. A band blade slicing machine comprising spaced blade supporting drums, a plurality of endless band blades running side by side about said drums, a corresponding plurality of individually movable blade tensioning assemblies mounted side by side in opposition to said blades, said blade tensioning assemblies each comprising a blade tensioning roller engaging the corresponding blade, a pivoted lever carrying said roller for movement toward and from the blade, and yielding means connected with said lever for urging the lever-carried roller into pressural engagement with its corresponding blade, mounting means supporting said lever and yielding means for adjustment movement along a direction line extending transversely of the blades, two courses of each of said blades between said drums being adapted to run in spaced parallel slicing planes, a row of blade twisting guide devices positioned along said blade courses and extending transversely thereof, there being one such guide device in said row for each blade course, said guide devices engaging the blade courses and causing them to run in said spaced parallel slicing planes, means for adjusting the spacing of said guide devices along a direction line extending transversely of the blade courses, whereby the spacing of the blade courses is adjusted, and means for correspondingly adjusting the spacing of the blade tensioning assemblies, including a rotatable screw member having a plurality of helixes of different pitches, one for each blade tensioning assembly, and individual means for moving said each of said levers along a direction line extending transversely of the blades, said means having screwthreaded association with the helixes of said screw member, whereby rotation of the latter affects translation of said levers along said line of adjustment movement.

4. A band blade slicing machine comprising spaced blade supporting drums, a plurality of endless band blades running side by side about said drums, a corresponding plurality of individually movable blade tensioning assemblies mounted side by side in opposition to said blades, said blade tensioning assemblies each comprising a blade tensioning roller engaging the corresponding blade, a pivoted lever carrying said roller for movement toward and from the blade, and yielding means connected with said lever for urging the lever-carried roller into pressural engagement with its corresponding blade, mounting means supporting said lever for adjustment movement along a direction line extending transversely of the blades, a row of blade twisting guide devices positioned along said blade courses and extending transversely thereof, there being one such guide device in said row for each blade course, said guide devices engaging the blade courses and causing them to run in said spaced parallel slicing planes, a rotatable screw member extending transversely of the blade courses having a plurality of helixes of different pitches, one for each blade guide device, said helixes having screwthreaded association with said blade guide devices, whereby rotation of said screw member effects translation of said guide devices along a direction line extending transversely of the blade courses, in such manner as to vary the spacing of the blade courses, and means for correspondingly adjusting the spacing of the blade tensioning assemblies, including a rotatable screw member having a plurality of helixes of different pitches, one for each blade tensioning assembly, and individual means for moving each of said levers along a direction line extending transversely of the blades, said means having screwthreaded association with the helixes of said screw member, whereby rotation of the latter effects translation of said levers along said line of adjustment movement.

5. A band blade slicing machine comprising spaced blade supporting drums, a plurality of endless band blades running side by side about said drums, a corresponding plurality of individually movable blade tensioning assemblies mounted side by side in opposition to said blades, said blade tensioning assemblies each comprising a blade tensioning roller engaging the corresponding blade, a pivoted lever carrying said roller for movement toward and from the blade, and yielding means connected with said lever means for urging the lever-carried roller into pressural engagement with its corresponding blade, mounting means supporting said lever for adjustment movement along a direction line extending transversely of the blades, a row of blade twisting guide devices positioned along said blade courses and extending transversely thereof, there being one such guide device in said row for each blade course, said guide devices engaging the blade courses and causing them to run in said spaced parallel slicing planes, a rotatable screw member extending transversely of the blade courses having a plurality of helixes of different pitches, one for each blade guide device, said helixes having screwthreaded association with said blade guide devices, whereby rotation of said screw member effects translation of said guide devices along a direction line extending transversely of the blade courses, in such manner as to vary the spacing of the blade courses, and means for correspondingly adjusting the spacing of the blade tensioning assemblies, including a rotatable screw member having a plurality of helixes of different pitches, one for each blade tensioning assembly, and individual means for moving each of said levers along a direction line extending transversely of the blades, said means having screwthreaded association with the helixes of said screw member, whereby rotation of the latter effects translation of said levers along said line of adjustment movement, and means for synchronously rotating said screw members in a manner to move the blade tensioning rollers so as to follow the blades as the spacings of the latter are changed by the blade guide devices.

6. A band blade slicing machine comprising spaced blade supporting drums, a plurality of endless band blades running side by side about said drums, a corresponding plurality of individually movable blade tensioning assemblies mounted side by side in opposition to said blades, said blade tensioning assemblies each comprising a blade tensioning roller engaging the corresponding blade, an individual pivoted lever carrying said roller for movement toward and from the blade, an individual resilient means connected with said lever for urging the lever-carried roller into pressural engagement with the corresponding blade, and an individual reaction means for said resilient means, said reaction means engaging said resilient means and being adjustably movable along a direction line extending transversely of the blades, mounting means supporting all of the levers for adjustment movement along a direction line extending transversely of the blades, a row of blade guide devices positioned along said blade courses and extending transversely thereof, there being one such guide device in said row for each blade course, said guide devices engaging the blade courses and causing them to run in said spaced parallel slicing planes, means for adjusting the spacing of said guide devices along a direction line extending transversely of the blade courses, whereby the spacing of the blade courses is adjusted, and means for correspondingly adjusting the spacing of the blade tensioning assemblies, including a pair of parallel rotatable screw members extending transversely of the blades each having a plurality of helixes of different pitches, one for each lever, individual means for moving each of said levers along said direction line, said means having screwthreaded association with corresponding helixes of one of said screw members, and said individual adjustably movable reaction means members having screw threaded connection with corresponding helixes of the other of said screw members.

7. A band blade slicing machine comprising spaced blade supporting drums, a plurality of endless band blades running side by side about said drums, a corresponding plurality of individually movable blade tensioning assemblies mounted side by side in opposition to said blades, said blade tensioning assemblies each comprising a blade tensioning roller engaging the corresponding blade, an individual pivoted lever carrying said roller for movement toward and from the blade, an individual resilient means connected with said lever for urging the lever-carried roller into pressural engagement with the corresponding blade, and an individual reaction means for said resilient means, said reaction means engaging said resilient means and being adjustably movable along a direction line extending transversely of the blades, mounting means supporting all of the levers for adjustment movement along a direction line extending transversely of the blades, two rows of blade twisting guide devices positioned along said blade courses and extending transversely thereof, said rows of blade guide devices being spaced from one another along said blade courses by a distance sufficient for articles to be sliced to pass therebetween, there being one blade guide device in each row for each of said blade courses, and said blade guide devices engaging and guiding all of the blade courses to run in said spaced parallel slicing planes between said rows of blade guide devices, means guiding and constraining said blade guide devices for adjustment movement in directions transverse of the blade courses, a rotatable screw member for each of said rows of blade guide devices, each of said screw members having a plurality of helixes of different pitches having operative engagement with consecutive members of the corresponding row of blade guide devices, a pair of parallel rotatable screw numbers extending transversely of the blades each having a plurality of helixes of different pitches, one for each of said blade tensioning assemblies, individual means for moving each of said levers along said direction line, said means having screwthreaded association with corresponding helixes of one of said screw members, and said individual adjustably movable reaction means members having screwthreaded connection with corresponding helixes of the other of said screw members.

8. A band blade slicing machine comprising spaced part blade supporting drums, a plurality of endless band blades running side by side about said drums, a corresponding plurality of individually movable blade tensioning assemblies mounted side by side in opposition to said blades, said blade tensioning assemblies each embodying an individual rotatable blade tensioning drum engaging its corresponding blade under pressure to individually tension its blade, each of said band blades being so mounted about said drums as to provide two blade courses between said spaced apart blade supporting drums, spaced apart rows of blade twisting guide devices positioned along said blade courses with the said rows extending transversely of said blade courses, there being two such guide devices for each blade course and the said two guide devices of each blade course being located in two of said spaced apart rows, said guide devices engaging the blade courses and causing them to run in spaced parallel slicing planes between the spaced apart guide devices, means for adjusting the spacing of the guide devices of each of said rows simultaneously and uniforming along an adjustment line extending transversely of the blade courses so that the spacing between the blade courses can be adjusted, and separate means for simultaneously and uniformly adjusting the spacing of said blade tensioning assemblies along an adjustment line extending transversely of the blade courses.

9. A band blade slicing machine comprising rotatably mounted band blade drums spaced apart to provide a slicing location between them, a plurality of endless band blades mounted side by side on said drums so as to provide two courses for each blade in said slicing location, said drums including for each blade an individual blade tensioning drum, means for individually and movably mounting each of said individual blade tensioning drums for pressural engagement with its blade to individually tension its blade, spaced apart rows of blade twisting guide devices positioned along said blade courses with the said rows extending transversely of said blade courses, there being two such guide devices for each blade course and the said two guide devices of each blade course being located in two of said spaced apart rows, said guide devices engaging the blade courses and causing them to run in spaced parallel slicing planes between the spaced apart guide devices, means for adjusting the spacing of the guide devices of each of said rows simultaneously and uniformly along an adjustment path extending transversely of the blade courses so that the spacing between the blade courses can be adjusted, and separate means for simultaneously and uniformly adjusting the spacing of said blade tensioning drums along an adjustment path extending transversely of the blade courses.

10. A band blade slicing machine comprising rotatably mounted band blade drums spaced apart to provide a slicing location between them, a plurality of endless band blades mounted side by side on said drums, said drums including for each blade an individual blade tensioning drum, means for individually and movably mounting each of said individual blade tensioning drums for pressural engagement with its blade to individually tension its blade, spaced apart blade twisting guide members co-acting with each blade to twist the blades into spaced parallel slicing planes at the slicing location, said blade twisting guide members being spaced apart sufficiently to permit the article that is to be sliced to pass therebetween, tension drum adjusting means for simultaneously and uniformly spreading or contracting said individual blade tensioning drums and their respective individual mounting means to uniformly vary the transverse spacing between said blade tensioning drums, and blade twisting guide member adjusting means for simultaneously and uniformly spreading or contracting the said blade twisting guide members to uniformly vary the transverse spacing between said blades in the slicing location.

11. A band blade slicing machine comprising rotatably mounted band blade drums spaced apart to provide a slicing location between them, a plurality of endless band blades mounted side by side on said drums, said drums including for each blade an individual blade tensioning drum, means for individually and movably mounting each of said individual blade tensioning drums for pressural engagement with its blade to individually tension its blade, spaced apart blade twisting guide members coacting with each blade to twist the blades into spaced parallel slicing planes at the slicing location, said blade twisting guide members being spaced apart sufficiently to permit the article that is to be sliced to pass therebetween, tension drum adjusting means for simultaneously and uniformly spreading or contracting said individual blade tensioning drums and their respective individual mounting means to uniformly vary the transverse spacing between said blade tensioning drums, blade twisting guide member adjusting means for simultaneously and uniformly spreading or contracting the said blade twisting guide members to uniformly vary the transverse spacing between said blades in the slicing location, and means interconnecting said tension drum adjusting means and said blade twisting guide member adjusting means to actuate both of said adjusting means simultaneously and in coordinated relation with respect to each other when said interconnecting means is actuated.

12. A band blade slicing machine comprising rotatably mounted band blade drums spaced apart to provide a slicing location between them, a plurality of endless band blades mounted side by side on said drums so as to present two courses on each blade for slicing action in said slicing location, said drums including for each blade an individual blade tensioning drum, means for individually mounting and pressing each of said individual blade tensioning drums against its blade to individually tension its blade, two spaced apart blade twisting guide members coacting with each of the two courses of substantially all of said endless band blades between said spaced apart drums to twist all the courses of substantially all of said endless band blades into spaced parallel slicing planes in the slicing location, the said two blade twisting guide members of each blade course being spaced apart sufficiently to permit the article that is to be sliced to pass between them, tension drum adjusting means for simultaneously and uniformly spreading or contracting said individual blade tensioning drums and their respective individual mounting means to uniformly vary the transverse spacing between said blade tensioning drums, blade twisting guide member adjusting means for simultaneously and uniformly spreading or contracting the said blade twisting guide members to uniformly vary the transverse spacing between the blade courses of the slicing blades in the slicing location, and means interconnecting said tension drum adjusting means and said blade twisting guide member adjusting means to actuate both of said adjusting means simultaneously and in coordinated relation with respect to each other when said interconnecting means is actuated.

13. A band blade slicing machine comprising a plurality of rotatably mounted band blade drums spaced apart to provide a slicing location between them, a plurality of endless band blades mounted on and about said drums in such manner that each of the two courses of each of said endless band blades passes from one side of one of said drums to the other side of another of said drums with an 180° twist of the blade between said drums so that the two courses of each blade cross each other in the slicing location, the aforesaid drums including for each blade an individual blade tensioning drum, means for individually and movably mounting each of said individual blade tensioning drums in pressural engagement with its blade to individually tension its blade, two spaced apart blade twisting guide members coacting with each course of substantially all of said endless band blades on opposite sides of the place where the two courses of each blade cross each other, said blade twisting guide members causing all the courses of substantially all said endless band blades to run in spaced parallel slicing planes at the slicing location, the said two blade twisting guide members of each blade course being spaced sufficiently apart to permit the article that is to be sliced to pass between them, tension drum adjusting means for simultaneously and uniformly spreading or contracting substantially all of said individual blade tensioning drums and their respective individual mounting means to uniformly vary the transverse spacing between said individual blade tensioning drums, blade twisting guide member adjusting means for simultaneously and uniformly spreading or contracting the said blade twisting guide members of all of the courses of substantially all said blades to uniformly vary the transverse spacing between said blade courses in the slicing location, and means interconnecting said tension drum adjusting means and said blade twisting guide member adjusting means to actuate both of said adjusting means simultaneously and in coordinated relation with respect to each other when said interconnecting means is actuated.

14. A band blade slicing machine comprising a plurality of rotatably mounted blade supporting drums spaced apart from each other to provide a slicing location between them, a plurality of endless band blades mounted on and about said blade supporting drums in such manner that each of the two courses of each of said endless band blades passes from one side of one of said blade supporting drums to the other side of the other of said blade supporting drums with an 180° twist of the blade between said blade supporting drums so that the two courses of each blade cross each other in the slicing location, a plurality of individual blade tensioning drums of which one coacts individually with each of said endless band blades, individual means for movably mounting each of said individual blade tensioning drums in pressural engagement with its blade to individually tension its blade, two spaced apart blade twisting guide members coacting with each course of substantially all of said endless band blades on opposite sides of the place where the two courses of each blade cross each other, said blade twisting guide members causing all the courses of substantially all said endless band blades to run in spaced parallel slicing planes at the slicing location, the said two blade twisting guide members of each blade course being spaced sufficiently apart to permit the article that is to be sliced to pass between them, tension drum adjusting means for simultaneously and uniformly spreading or contracting substantially all of said individual blade tensioning drums and their respective individual mounting means to uniformly vary the transverse spacing between said blade tensioning drums, blade twisting guide member adjusting means for simultaneously and uniformly spreading or contracting the said blade twisting guide members of all said courses of substantially all of said blades to uniformly vary the transverse spacing between said blade courses in the slicing location, and means for synchronously operating said tension drum adjusting means and said blade twisting guide member adjusting means in such manner that said individual blade tensioning drums during their said adjustment follow and maintain their engagement with their respective endless band blades throughout the said adjustment of said blades as caused by the said blade twisting guide member adjusting means.

15. A band blade slicing machine comprising rotatably mounted band blade drums spaced apart to provide a slicing location between them, a plurality of endless band blades mounted side by side on said drums so as to present two courses of each blade for slicing action in said slicing location, said drums including for each blade an individual blade tensioning drum, means for individually and movably mounting each of said individual blade tensioning drums in pressural engagement with its blade to individually tension its blade, two spaced apart blade twisting guide members coacting with each of the two courses of substantially all of said endless band blades between said spaced apart drums to twist all the courses of substantially all of said endless band blades into spaced parallel slicing planes in the slicing location, the said two blade twisting guide members of each blade course being spaced sufficiently apart to permit the article that is to be sliced to pass between them, tension drum adjusting means for simultaneously and uniformly spreading or contracting in opposite directions about the approximate center of the machine the said individual blade tensioning drums and their said respective individual mounting means to uniformly vary the transverse spacing between said blade tensioning drums, blade twisting guide member adjusting means for simultaneously and uniformly spreading or contracting in opposite directions about the approximate center of the machine the said blade twisting guide members to uniformly vary the transverse spacing between the blade courses in the slicing location, and means for synchronously operating said tension drum adjusting means and said blade twisting guide member adjusting means in such manner that said individual blade tensioning drums during their said adjustment follow and maintain their engagement with their respective endless band blades throughout the said adjustment of said endless band blades as caused by said blade twisting guide member and adjusting means.

16. A band blade slicing machine comprising rotatably mounted band blade drums spaced apart to provide a slicing location between them, a plurality of endless band blades mounted side by side on said drums, said drums including for each blade an individual blade tensioning drum, means for individually and movably mounting each of said individual blade tensioning drums for pressural engagement with its blade to individually tension its blade, spaced apart blade twisting guide members co-acting with each blade to twist the blades into spaced parallel slicing planes at the slicing location, said blade twisting guide members being spaced apart sufficiently to permit the article that is to be sliced to pass therebetween, tension drum adjusting means for spreading or contracting said individual blade tensioning drums and their respective individual mounting means to uniformly varied transverse spacing between said blade tensioning drums, blade twisting guide member adjusting means for spreading or contracting the said blade twisting guide members to uniformly varied transverse spacing between said blade twisting guide members to thereby move the blade to uniformly varied spacing, and means so interconnecting said tension drum adjusting means and said blade twisting guide member adjusting means that each individual blade tensioning drum is so moved during adjustment as to maintain its pressural engagement with its respective endless band blade during the said adjusting motion of its endless band blade as caused by said blade twisting guide member adjusting means.

WILLIAM WALTER HARTMAN.

CERTIFICATE OF CORRECTION.

Patent No. 2,173,038.   September 12, 1939.

WILLIAM WALTER HARTMAN.

It is hereby certified that error appears in the printed specification of the above numbered patent requiring correction as follows: Page 7, second column, line 28, claim 3, strike out "said" first occurrence; page 8, second column, line 70, claim 8, for the word "part" read apart; page 9, first column, line 17-18, same claim, for "uniforming" read uniformly; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.

guide members being spaced apart sufficiently to permit the article that is to be sliced to pass therebetween, tension drum adjusting means for spreading or contracting said individual blade tensioning drums and their respective individual mounting means to uniformly varied transverse spacing between said blade tensioning drums, blade twisting guide member adjusting means for spreading or contracting the said blade twisting guide members to uniformly varied transverse spacing between said blade twisting guide members to thereby move the blade to uniformly varied spacing, and means so interconnecting said tension drum adjusting means and said blade twisting guide member adjusting means that each individual blade tensioning drum is so moved during adjustment as to maintain its pressural engagement with its respective endless band blade during the said adjusting motion of its endless band blade as caused by said blade twisting guide member adjusting means.

WILLIAM WALTER HARTMAN.

CERTIFICATE OF CORRECTION.

Patent No. 2,173,038. September 12, 1939.

WILLIAM WALTER HARTMAN.

It is hereby certified that error appears in the printed specification of the above numbered patent requiring correction as follows: Page 7, second column, line 28, claim 3, strike out "said" first occurrence; page 8, second column, line 70, claim 8, for the word "part" read apart; page 9, first column, line 17-18, same claim, for "uniforming" read uniformly; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.